(12) United States Patent
Carter et al.

(10) Patent No.: US 7,111,893 B2
(45) Date of Patent: Sep. 26, 2006

(54) HINGED DOOR MODULE BRACKET

(75) Inventors: Eluid David Carter, Southfield, MI (US); Thomas Risner, Highland, MI (US); James Campbell, Jr., Sterling Heights, MI (US); Santhosh Karumuri, Inkster, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 39 days.

(21) Appl. No.: 10/816,261

(22) Filed: Apr. 1, 2004

(65) Prior Publication Data

US 2005/0218693 A1 Oct. 6, 2005

(51) Int. Cl.
*B60J 5/04* (2006.01)

(52) U.S. Cl. ............... 296/146.1; 49/503; 292/DIG. 23

(58) Field of Classification Search ............ 296/146.1, 296/146.5; 49/501, 502, 503; 292/DIG. 23
See application file for complete search history.

(56) References Cited

U.S. PATENT DOCUMENTS

| 4,904,004 A | 2/1990 | Bartczak |
| 6,381,906 B1 | 5/2002 | Pacella et al. |

*Primary Examiner*—Joseph D. Pape
(74) *Attorney, Agent, or Firm*—Carlson, Gaskey & Olds

(57) ABSTRACT

A door module includes a bracket having a hinge portion which permits alignment of the handle support of the door module with a door shell attachment portion. The hinge portion of the bracket comprises a flexible strip that allows the bracket to flex between a first and second position. To install the door module, the hinge portion of the bracket is flexed to the first position such that additional clearance is provided between the door module and the door shell. The door module is located in the door shell and aligned with the door shell attachment portion. The hinge portion is released to a second position and the handle support is secured to an outside handle.

8 Claims, 4 Drawing Sheets

HINGED DOOR MODULE BRACKET

BACKGROUND OF THE INVENTION

This invention relates to vehicle door assemblies and, more particularly, to a vehicle door module with an attachment portion to secure and align an external handle during installation of the door module.

A vehicle door typically includes an outer shell that houses various door components. The door components include a door panel that is received into the outer shell. The door panel operates as an attachment for various door components such as window guides, a safety system, a sound system, and a door locking mechanism. The door panel, attached components, and accompanying system of cables and wires to operate the various components are typically preassembled and then installed into the outer shell as a module.

In particular, the door module includes a handle support that attaches to an external handle through a door shell attachment portion. To attach the external handle to the handle support, the handle support must be aligned with the attachment portion.

Clearance between the width of the door module and the inner width of the door shell is generally small, which may increase the difficulty for an assembler to insert the door module into the door shell and visually align the handle support with the door shell attachment portion. Also, the door module is generally rigid and may be difficult to adjust relative to the attachment portion once the door module is inside the door shell. Presently, insertion of the door module into the door shell, alignment of the handle support with the attachment portion, and attachment of the external handle may be a laborious task.

Accordingly, it is desirable to provide a door module that permits relatively uncomplicated installation and alignment of a handle support.

SUMMARY OF THE INVENTION

The door module according to the present invention includes a latch bracket attached to a door panel. The latch bracket is attached to a door latch which is attached to a handle bracket. The handle bracket includes a hinge portion that flexes during installation of the door module into the door shell. The handle bracket attaches to a handle support that connects to an external door handle through the door shell.

Another door module includes a handle bracket having an annular body portion, a latch attachment portion, and a handle support arm. Arcuate hooks couple the door latch to the handle bracket in a "snap-fit" type of design. A flexible strip allows the handle bracket to flex between positions.

In another door module, a method for aligning the door module with the door shell attachment portion includes flexing a biased hinge portion of the handle bracket to a first position that allows the door module greater clearance with the door shell and facilitates installation of the door module. The greater clearance also allows an assembler to visually align the handle support with the door shell attachment portion.

Another door module includes a handle bracket having a sheathed portion that blocks a seam located on the door latch to prevent debris, water and the like from directly impinging upon the door latch.

In another door module, the handle bracket includes an annular body portion with a latch support attachment portion that engages a latch attachment portion. The annular body portion includes a flexible strip hinge portion that allows the handle bracket to flex between positions. The latch attachment portion of the handle bracket is secured to the door latch and the latch support attachment portion. Arcuate hooks mate with the door latch in a "snap-fit" type of design. A sheathed portion extends from the engagement portion and covers a seam located on the door latch to prevent debris, water and the like from directly impinging upon the door latch.

The door module according to the present invention provides a bracket having a hinge portion that allows uncomplicated alignment of the handle support.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
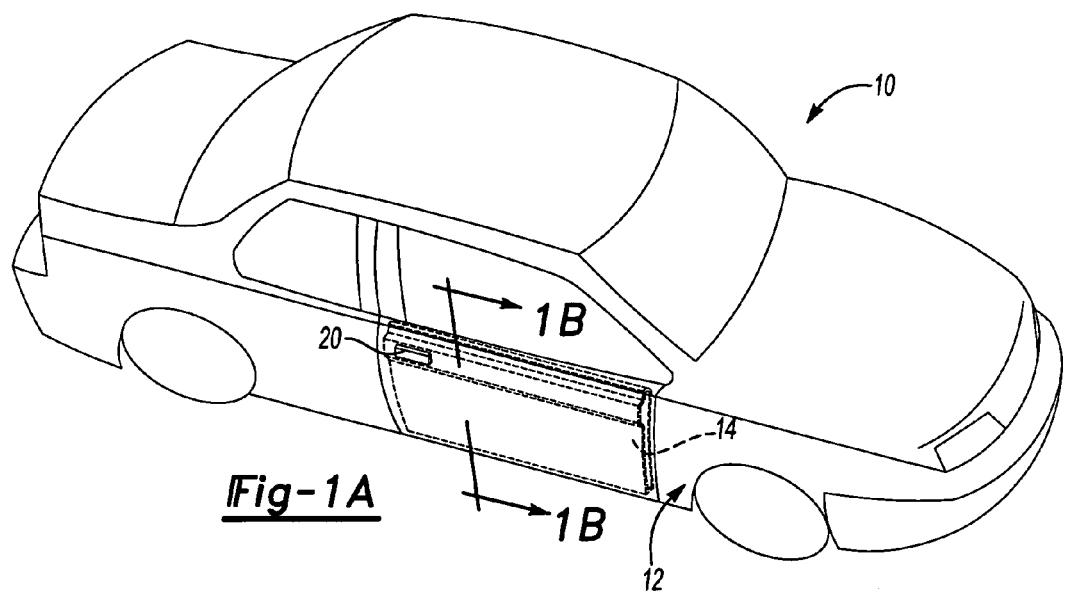
FIG. 1A shows general perspective view of a vehicle having a door and a door module.
Figure 1B:
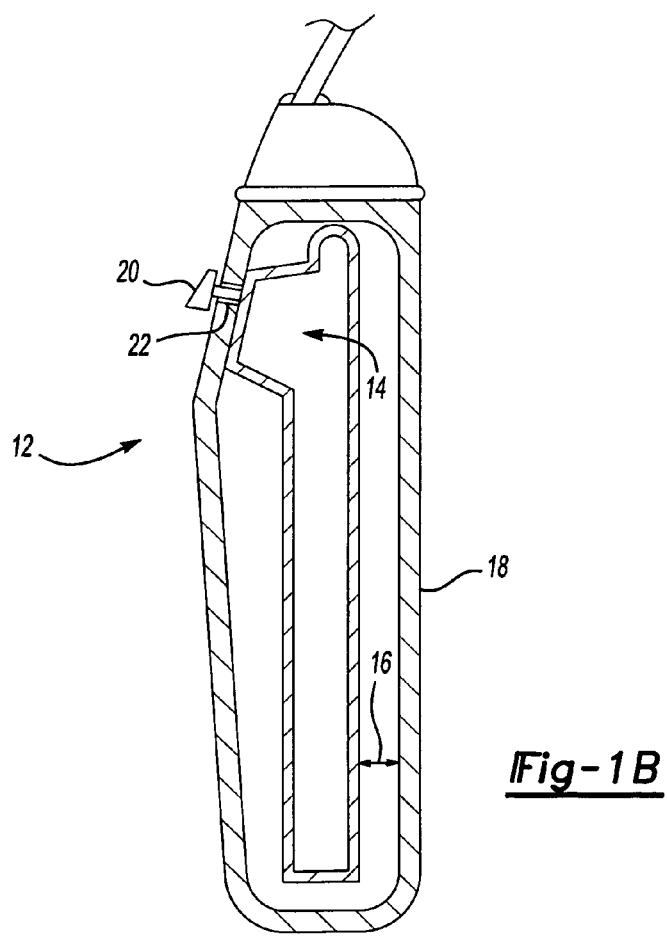
FIG. 1B shows a cross sectional view of a door module received in a door shell.

FIG. 1A illustrates a vehicle 10 having a door 12. The door 12 includes a door module 14. As shown in FIG. 1B, a door shell 18 of the door 12 receives the door module 14 therein with a clearance 16 between the door module 14 and the door shell 18. The door module 14 is coupled to an external handle 20 through a door shell attachment portion 22.

Figure 2:
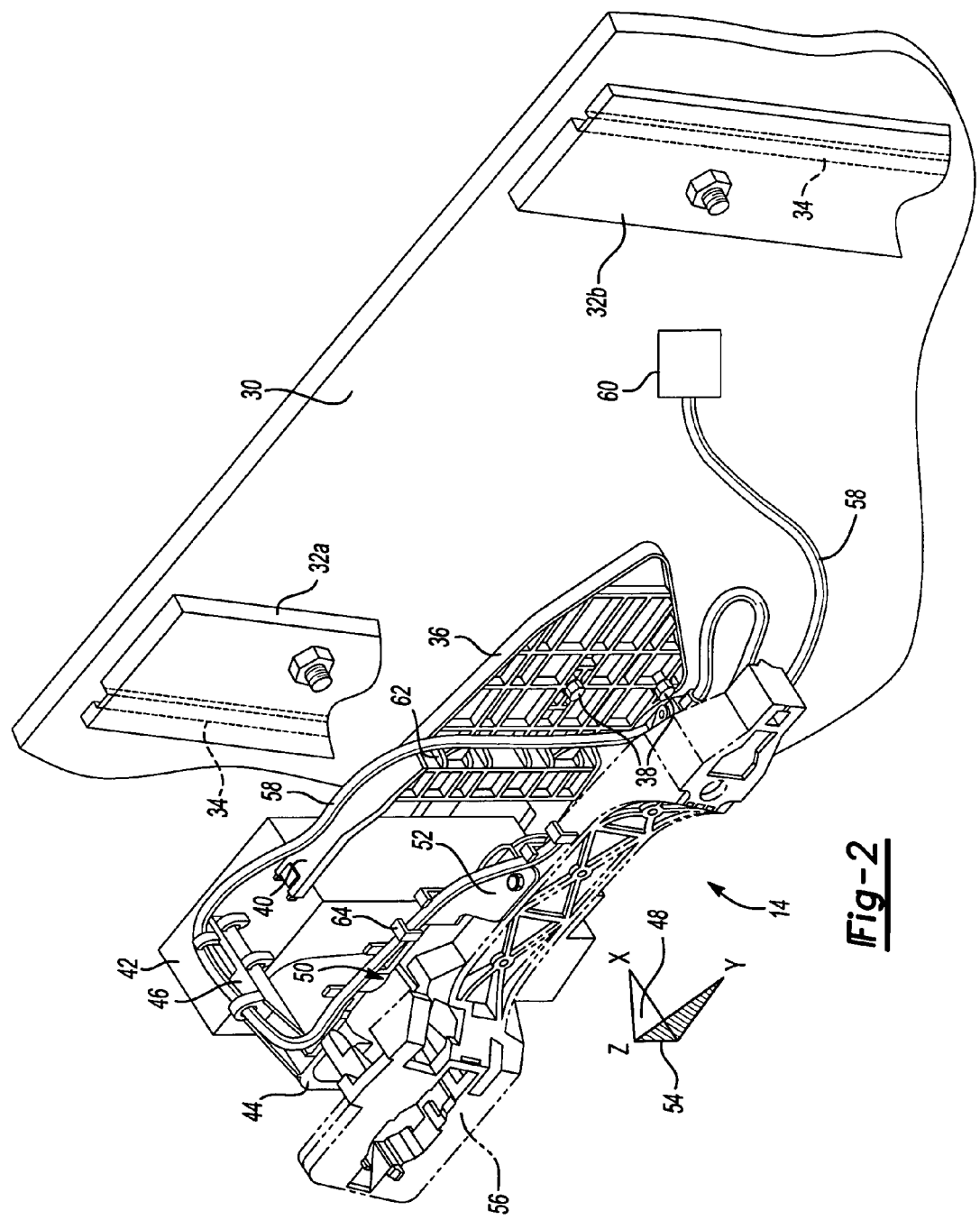
FIG. 2 shows an angled perspective view of a door module.

Referring to FIG. 2, the door module 14 includes a door panel 30 that accommodates window guides 32a and 32b, each of which define parallel axes 34 along which a window (not shown) moves. A latch bracket 36 is attached to the door panel 30 and extends generally perpendicular to the axis 32a, 32b. The latch bracket 36 includes attachment bosses 38 for attachment to the door panel 30 through fasteners or the like. An extended support arm 40 attaches to a door latch 42. The door latch 42 is attached to a handle bracket 44 with a latch attachment portion 46 that extends generally in the X-Z plane 48 which is generally perpendicular to the door panel 30. The handle bracket 44 further includes a hinge portion 50 that can pivot from an open to a closed position during installation of the door module 14 into the door shell 18. A handle support arm 52 of the handle bracket 44 extends generally in the Z-Y plane 54 and attaches to a handle support 56. The handle support 56 connects to the external handle 20 through the door shell 18 as referred to in FIG. 1B.

The door module 14 also includes a personal identification code ("PIC") cable 58 that operates an entry keypad (not shown) on the exterior of the door. The PIC cable 58 routes through the handle support 56, the handle bracket 44, and the latch bracket 36 to a controller unit 60 in the vehicle 10. The latch bracket 36 and the handle bracket 44 include a latch bracket cable holder 62 and handle bracket cable holder 64, respectively, for routing and retaining the PIC cable 58.

Figure 3:
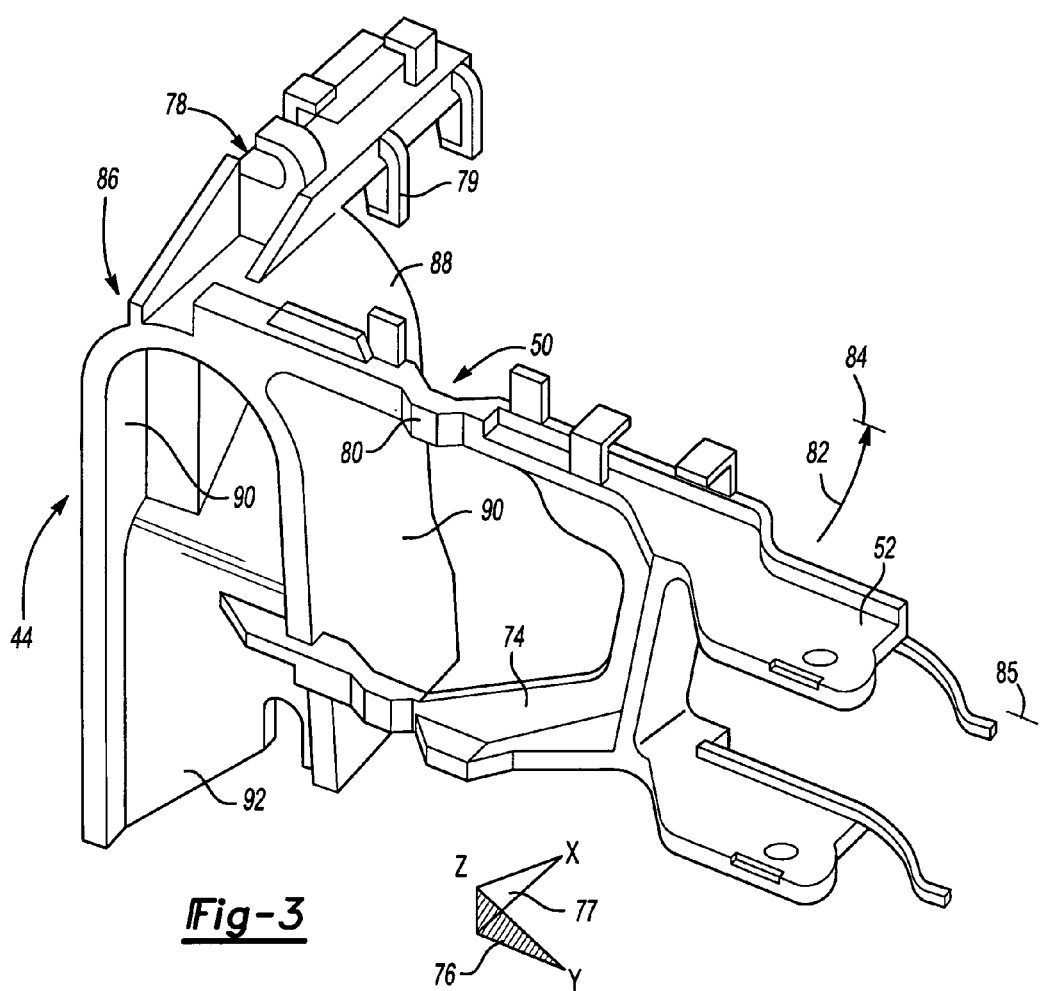
FIG. 3 shows an angled perspective view of a handle bracket.

Referring to FIG. 3, the handle bracket 44 includes an annular body portion 74 defining a Z-Y plane 76. A latch attachment portion 78 extends generally in the X-Z plane 77 and secures the door latch 42 (FIG. 2) using arcuate hooks 79. The arcuate hooks 79 preferably mate with the door latch 42 in a "snap-fit" type of design. The handle support arm 52 extends in the Z-Y plane 76 for securing the handle support 56 (FIG. 2).

The annular body portion 74 includes a hinge portion 50. The hinge portion 50 comprises a flexible strip 80 that allows the handle support arm 52 to flex relative to the door panel 30. Flexing the hinge portion 50 in a direction 82 achieves a first position 84.

The hinge portion 50 provides a method for aligning the handle support 56 of the door module 14 with the door shell attachment portion 22. The method includes flexing the hinge portion 50 to a first position 84 and inserting the door module 14 into the door shell 18. The first position 84 is relatively closer to the door panel 30 than before flexing. The handle support 56 is aligned with the door shell attachment portion 22, and the hinge portion 50 is unflexed to a second position 85. The second position 85 is relatively farther from the door panel 30 than the first position. The external handle 20 is attached through the door shell attachment portion 22. The hinge portion 50 is biased to the second position 85. When flexing the hinge portion 50 to the first position 84, the hinge portion 50 must be held at the first position while inserting the door module 14 into the door shell 18. When the hinge portion 50 is released from the first position 84, the bias moves the hinge portion to the second position 85. In other examples, the hinge portion 50 has no bias or is biased toward the first position.

The hinge portion 50 provides for alignment of the handle support 44 with the door shell attachment portion 22. During assembly, flexing the hinge portion 50 to the first position 84 creates increased clearance 16 between the door shell 18 and the door module 14 than if the hinge portion was rigid. The increased clearance facilitates insertion of the door module 14 into the door shell 18. Also, the greater clearance 16 allows an assembler to visually align the handle support 56 with the door shell attachment portion 22. The hinge portion 50 has no function once the door module has been installed.

The handle bracket 44 also includes a sheathed portion 86 that extends generally perpendicular from the latch attachment portion 78. The sheathed portion 86 includes a generally arcuate surface 88 that extends into two planar walls 90. The planar walls 90 further include a center wall 92 interposed between the planar walls 90. The center wall 92 preferably blocks a seam located on the door latch 42 (not shown) to prevent debris, water and the like from directly impinging upon the door latch 42.

Figure 4:
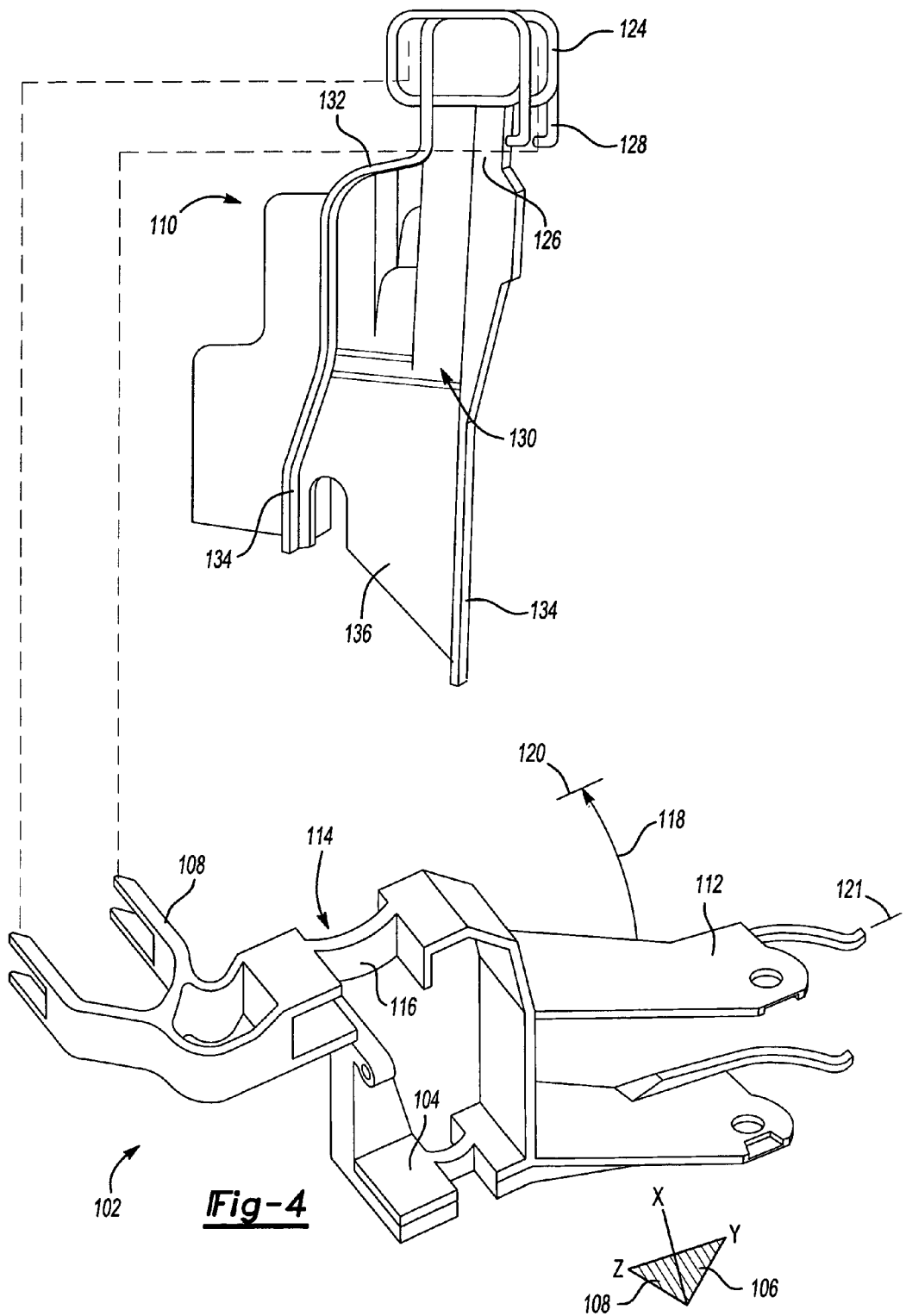
FIG. 4 shows an angled perspective view of another handle bracket.

Referring to FIG. 4, the handle bracket 102 includes an annular body portion 104 defining a Z-Y plane 106, which is approximately parallel to the door panel 30. A latch support attachment portion 108 extends generally in the X-Z plane 108 and engages a latch attachment portion 110. The handle support arm 112 extends in the Z-Y plane 106 for securing the handle support 56 (FIG. 2).

The annular body portion 104 includes a hinge portion 114. The hinge portion 114 comprises a flexible strip 116 that allows the handle support arm 112 to flex relative to the door panel 30. Flexing the hinge portion 114 in a direction 118 achieves a first position 120. Unflexing the hinge portion 114 achieves a second position 121. The hinge portion 114 is biased to the second position, although in other examples the hinge portion 50 is biased to the first position or has no bias.

The latch attachment portion 110 of the handle bracket 102 includes an engagement portion 122 for securing to the door latch 42 (FIG. 2). The engagement portion 122 includes an upper engagement portion 124 and a lower engagement portion 126. The upper engagement portion 124 secures the latch attachment portion 110 to the latch support attachment portion 108. The lower engagement portion 126 secures the latch attachment portion 110 to the door latch 42 using arcuate hooks 128. The arcuate hooks 128 preferably mate with the door latch 42 in a "snap-fit" type of design.

The latch attachment portion 110 also includes a sheathed portion 130 that extends generally perpendicular from the engagement portion 122. The sheathed portion 130 includes a generally arcuate surface 132 that extends into two planar walls 134. The planar walls 134 further include a center wall 136 interposed between the planar walls 134. The center wall 136 preferably blocks a seam located on the door latch 42 (not shown) to prevent debris, water and the like from directly impinging upon the door latch 42.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A vehicle door module comprising:
   a door panel;
   a bracket coupled to said door panel, said bracket comprising a hinge portion which permits said bracket to flex; and
   a handle support coupled to said bracket.

2. The vehicle door module as recited in claim 1, wherein said hinge portion comprises a flexible strip.

3. The vehicle door module as recited in claim 1, wherein said hinge portion is biased either towards or away from said door panel.

4. The vehicle door module as recited in claim 1, wherein said bracket comprises an annular body portion, a latch attachment portion that transversely extends from a plane defined by said annular body portion to secure a door latch, and a handle support arm that extends at least partially within said plane.

5. The vehicle door module as recited in claim 4, wherein said latch attachment portion comprises a sheathed portion that extends perpendicularly from said latch attachment portion.

6. The vehicle door module as recited in claim 4, wherein said latch attachment portion comprises arcuate hooks for securing said door latch.

7. The vehicle door module as recited in claim 1, wherein said bracket comprises an annular body portion, a latch support attachment portion that transversely extends from a plane of said annular body portion to secure a latch support, and a handle support arm that extends within said plane.

8. The vehicle door module as recited in claim 7, wherein said latch support attachment portion comprises arcuate hooks for securing said latch support.

* * * * *